United States Patent [19]

Doering

[11] Patent Number: 4,799,356
[45] Date of Patent: Jan. 24, 1989

[54] SYNTHESIS GAS GENERATION COMPLEX AND PROCESS

[75] Inventor: Egon L. Doering, Pasadena, Tex.

[73] Assignee: Shell Oil Company, Houston, Tex.

[21] Appl. No.: 890,035

[22] Filed: Jul. 28, 1986

[51] Int. Cl.⁴ .............................................. F01K 17/00
[52] U.S. Cl. ........................................ 60/648; 60/653; 60/677
[58] Field of Search ................. 60/648, 653, 670, 677; 110/229; 122/5; 48/197 R, 210

[56] References Cited

U.S. PATENT DOCUMENTS

| 3,150,487 | 9/1964 | Mangan et al. | |
|---|---|---|---|
| 3,234,735 | 2/1966 | Pirsh et al. | 60/39.181 |
| 3,986,349 | 10/1976 | Egan | 60/39.02 |
| 3,990,229 | 11/1976 | Staege | 60/39.02 |
| 4,092,825 | 6/1978 | Egan . | |
| 4,098,324 | 7/1978 | Kümmel et al. | 122/5 X |
| 4,099,374 | 7/1978 | Foster-Pegg . | |
| 4,150,953 | 4/1979 | Woodmansee | 48/71 |
| 4,178,758 | 12/1979 | Paull et al. | 60/648 |
| 4,212,160 | 7/1980 | Blaskowski . | |
| 4,288,979 | 9/1981 | Liljedahl et al. . | |
| 4,326,373 | 4/1982 | Giles . | |
| 4,341,069 | 7/1982 | Bell et al. . | |
| 4,424,766 | 1/1984 | Boyle . | |
| 4,442,665 | 4/1984 | Flek et al. . | |
| 4,566,267 | 1/1986 | Müller et al. . | |
| 4,569,194 | 2/1986 | Giles et al. . | |
| 4,569,680 | 2/1986 | Darling et al. | 122/5 X |

FOREIGN PATENT DOCUMENTS 2075124 11/1981 United Kingdom .

Primary Examiner—Stephen F. Husar
Attorney, Agent, or Firm—Albert J. Adamcik

[57] ABSTRACT

A synthesis gas-power generation complex is disclosed, the complex being characterized by ability to generate sufficient electrical power for internal use and for export, and by structure for improved heat recovery and utilization. A process for synthesis gas production and power generation utilizing these concepts is also disclosed.

6 Claims, 1 Drawing Sheet

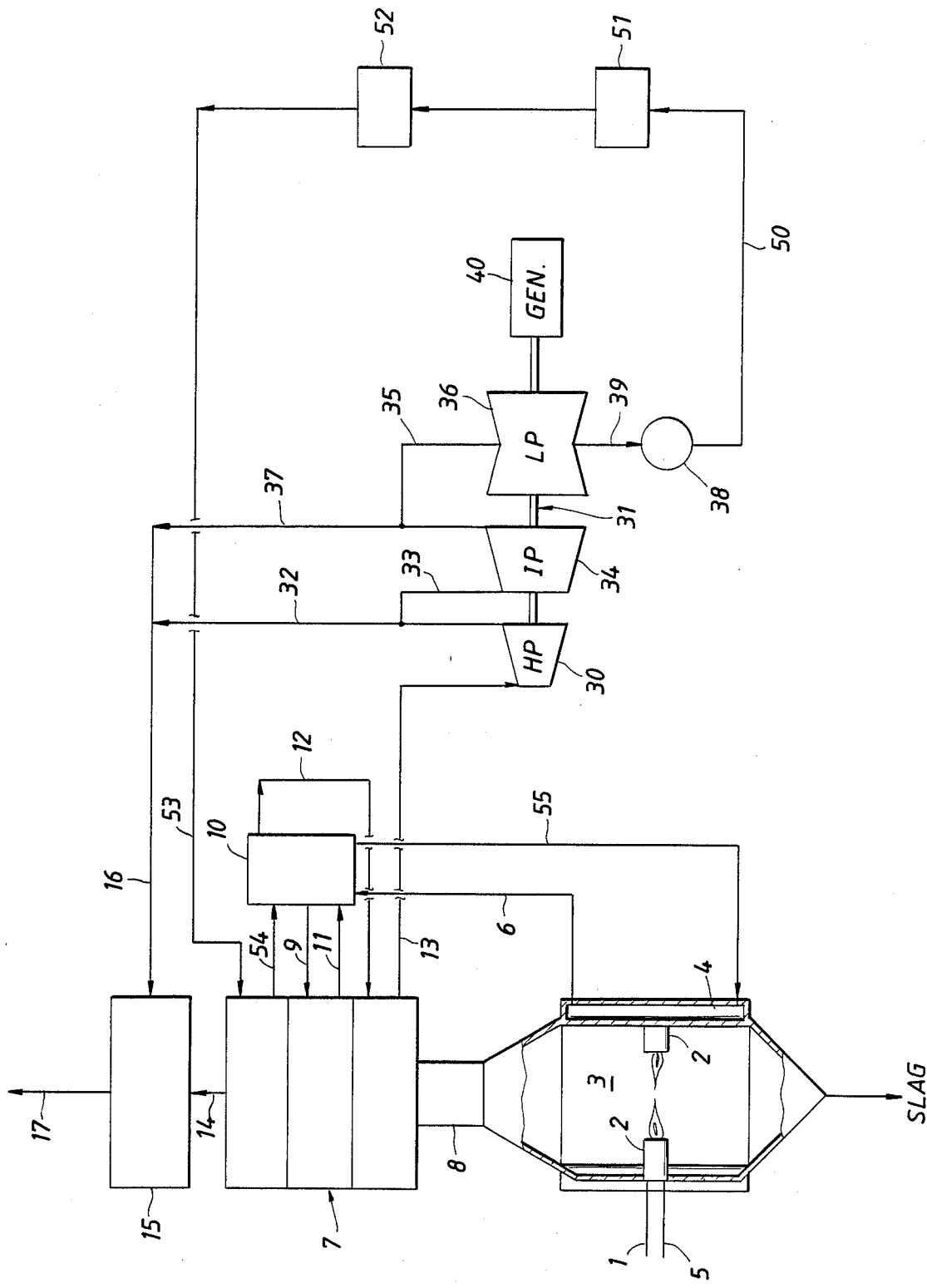

SYNTHESIS GAS GENERATION COMPLEX AND PROCESS

BACKGROUND OF THE INVENTION

One means of using coal in a relatively pollution-free manner to generate power is to burn the coal in a gasifier, producing a gas (synthesis gas) which can be used in a combined cycle (a gas turbine and a steam generator in series), both of which drive electrical generators. In some instances, however, it may be difficult or inadvisable to integrate the gasifier thermally into the power complex. For example, in the case of a pre-existing power plant, or where space limitations are prsent, it may be desirable to have a "stand alone" gasifier operation. In such a case, the synthesis gas produced may be sent by pipeline to the power complex.

The separate character of the gasifier complex does not means, however, that efficiencies cannot be achieved. To the contrary, judicious internal thermal integration of the gasifier complex permits highly efficient utilization of such stand alone complexes in the circumstances mentioned, as well as in other cases. The invention is directed to synthesis gas generation and power generation with improved efficiency.

SUMMARY OF THE INVENTION

Accordingly, in one embodiment, the invention comprises a complex adapted to produce synthesis gas, the complex being characterized by at least one specialized coal gasifier having its own steam generation power complex associated therewith, the steam generation and power segments being carefully thermally integrated with the gasifier and gas cleanup section. It is an advantage of the invention that the gasifier-superheated steam generation heat recovery exchange unit generates sufficient power for the air separation plant providing oxygen for the gasification, as well as miscellaneous power needs, and still, in the normal case, provides power for expost.

In accordance with the invention, the heat exchange section associated with the gasifier supplies dry, superheated steam to a steam turbine, which drives an electrical generator. Such a direct transfer is made possible by (a) the temperature-enthalpy distribution of the heat exchange section associated with the gasifier of the invention, and (b) maximum steam geenration in the heat exchange section gained by supply of heated water, i.e. heated condensate from the condenser associated with the steam turbine, to the heat exchange section. Additionally, a portion of the condensate is supplied for heat exchange duty to the exchange surfaces of the gasifier, the steam generated preferably being supplied for further heating in the heat exchange section associated with the gasifier. Finally, intermediate pressure and low pressure steam from segments of the steam turbine may be carefully integrated into the cleanup section of the invention.

In another embodiment, the invention comprises a process for the production of synthesis gas, the process being characterized by the use of a procedure for partial oxidation of coal, in the manner hereinafter described, and the careful integration of various thermally efficient procedures into the overall process for a high degree of energy efficiency and effective power recovery.

Accordingly, the invention relates to a synthesis gas generation complex comprising (a) a coal gasification plant, including at least one gasifier for the gasification of coal to produce synthesis gas at a temperature of 2000° F. to 3000° F., the gasifier having heat exchange surfaces adapted for indirect heat exchange with steam and water and preferably comprising a burner section having at least one burner adapted to utilize dry particulate coal;

(b) a heat exchange seciton comprising at least one heat exchanger in gas flow communication with said gasifier, said heat exchanger comprising at least one segment adapted to generate superheated steam, and lower temperature heat exchange segments;

(c) a gas cleanup section in flow communication with said heat exchanger, said cleanup section comprising means for removing particulates and $H_2S$ from said synthesis gas;

(d) a steam turbine adapted to receive and utilize superheated steam and produce a low temperature vapor, said steam turbine driving an electrical generator;

(e) means for providing superheated steam from said heat exchanger to said steam turbine;

(f) means for condensing low temperature vapor from said steam turbine to produce condensate, in flow communication with said steam turbine;

(g) means for supplying condensate, from said means for condensing low temperature vapor, to a lower temperature heat exchange segment of at least one heat exchanger in said heat exchange section for indirect heat exchange of said condensate;

(h) means for recovering heated condensate from said lower temperature heat exchange segment; and (i) means for supplying heated condensate from said means for recovering heated condensate to the heat exchange surfaces of a gasifier in said gasification zone for indirect heat exchange generation of steam.

The term "condensate", as used herein, may include any make-up water added to the water condensed from said steam turbine, and the means for supplying condensate from said means for condensing low temperature vapor may include means for allowing for further heat exchange of the condensate and deaeration thereof, and does include intermediate structure which is employed in an transfer of the condensate to the exchanger. The means for recovering heated condensate includes lines or conduits from the lower temperature heat exchange section mentioned, as well as holding or collecting vessels for the liquid and/or steam.

As indicated, means for passing intermediate or low pressure steam from segments of the steam turbine to the cleanup section may be provided.

In another embodiment, the invention relates to a process for the production of synthesis gas and power generation comprising (a) partially oxidizing coal at an elevated temperature by feeding dry particulate coal and oxygen to a gasification zone, the gasification zone preferably comprising at least one burner for oxidizing the coal, the ratio of coal to oxygen being such as to maintain a reducing atmosphere, and producing raw synthesis gas having a temperature of from about 2000° F. to about 3000° F., and removing heat from said synthesis in said gasification zone by indirect heat exchange with steam and water at a temperature of from about 220° F. to about 650° F.;

(b) passing raw synthesis gas from step (a) to a heat exchange zone comprising a superheated steam generating system section and a lower temperature heat exchange section, and removing heat from said synthesis gas by indirect heat exchange with steam, and water at a temperature of from about 220° F. to about 650° F., and producing superheated steam from said steam;

(c) removing particulates and H₂S from said raw synthesis gas, producing a purified synthesis gas;

(d) passing superheated steam from said heat exchange zone to at least one steam turbine, and expanding superheated steam from said heat exchange zone through said steam turbine, producing a low temperature water vapor and driving said turbine, said steam turbine driving an electrical generator and producing electric power;

(e) condensing said low temperature water vapor, and passing condensate to the lower temperature heat exchange section, and utilizng said condensate as the water in step (b), producing heated condensate; and (f) utilizing heated condensate produced by heat exchange in step (e) as the water for indirect heat exchange in step (a).

The steam generated in the gasifier shell is passed to the heat exchange zone where it is superheated and then sent for utilization.

As mentioned, an important part of the invention is the employment of that type of gasification equipment or procedure which produces synthesis gas having the high heat content necessary for raising the superheated steam in the heat exchange section or zone of the invention. The gasification should be carried out utilizing techniques suitable for producing a synthesis gas having a gasifier outlet temperature of from about 2000° F. to about 3000° F., preferably 2350° F. to about 2500° F. Although some fluidized bed oxidizers are capable of producing such gas temperatures under the conditions mentioned herein, the process is preferably carried out with a gasifier comprising at least one burner. Such a process will preferably include combustion, with oxygen, of dry particulate coal, i.e., coal having less than about 10 percent water content. Steam may be added in some instances to assist in the combustion. The type of coal utilized is not critical, but it is an advantage of the invention that lower grade coasl, such aslignite or brown coal, may be used. If the water content of the coal is too high to meet the requirements mentioned, supra, the coal should be dried before use. The atmosphere will be maintained reducing by the regulation of the weight ratio of the oxygen to moisture and ash free coal in the range of about 0.6 to 1.0, preferably 0.8 to 0.9. The specific details of the equipment and procedures employed form no part of the invention, but those described in U.S. Pat. No. 4,350,103, and U.S. Pat. No. 4,458,607, both incorporated herein by reference, may be employed. In view of the high temperatures required, however, suitable structural materials, such as the Inconels and Incoloy 800, i.e., high chrome-molybdenum steels, should be employed for superheating duty for long exchanger life. It is an advantage of the invention that, by carrying out the preferred procedure described herein, or utilizing the preferred structural aspects mentioned, as described, a synthesis gas stream is produced having the temperature necessary to generate superheated steam, while having a composition which has reduced failure of the aforementioned structural materials.

The particular types of equipment employed, within the limitations mentioned, are not critical. The key to the invention is, as mentioned, the judicious integration of a particular type of coal gasification technique or practice with operations or structure to achieve improved energy efficiency. Pressures employed are not critical, those skilled in the art being capable, given the temperatures specified, of providing suitable pressure levels in the various units of the invention.

DETAILED DESCRIPTION OF THE INVENTION

In order to disclose the invention more fully, reference is made to the accompanying drawing. The drawing is a schematic representation of the process flow type, and illustrates the efficient integration of the specialized gasifier with combined steam and power generation. All values specified in the description relating thereto hereinafter are calculated, or merely illustrative.

Accordingly, dry particulate coal (average particle size about 30 to 50 microns and moisture content of less than about 10 percent by weight) is fed via line (1) to burners (2) of gasifier (3). Gasifier (3) is a vertical oblong vessel, preferably cylindrical in the burner area, with substantially conical upper and lower ends, and is defined by a surrounding membrane wall structure (4) for circulation of cooling fluid. Preferably, the generally cylindrical reactor wall will comprise a plurality of heat exchange tubes, spaced apart from each other by "membranes" or curved plates, the tubes being connected at their extremities for continuous flow of a heat exchange fluid, such as water, and also having multiple inlets/outlets for the fluid. Concomitantly, oxygen is introduced to the burners (2) via line (5), the weight ratio of oxygen to moisture and ash free coal being about 0.9. The combustion produces a flame temperature of about 4000° F., with a gas temperature at the outlet of the gasifier being about 2300° F. to about 2600° F. Regulation of gasifier and outlet temperature is assisted by coolant in the membrane wall structure (4). Steam is generated from water supplied via line (55) in the tubes of "shell" (4), and steam and heated water are passed to a steam collector or drum (10) via line (6) for further heating.

Hot raw synthesis gas leaves gasifier (3) through duct (8) and is quenched, preferably with recycle gas. Duct (8) is also jacketed for heat recovery, although this is not illustrated. The quenched gas then passes to heat exchanger (7). Heat exchanger (7) is preferably a three section exchanger also of membrane wall design, the quenched synthesis gas being cooled by fluid in the tubes. The exchanger preferably has three sections (shown only in block form) i.e., a superheater, an evaporator, and a low temperature section. Water in line (53) enters the low temperature section, is heated, and then passes via line (54) to collector or vessel (10). Heated water from vessel (10) passes via line (9) to the evaporator section of the exchanger. Here it is partially vaporized, and passes back via line (11) to the steam collector (10). From there, steam is passed, via line (12), to the superheated section of exchanger (7), wherein the steam is superheated. Superheated steam is then, in accordance with the invention, forwarded to a steam turbine via line (13), as described more fully hereinafter.

The raw synthesis gas, now cooled in the low temperature section of heate exchanger (7) to a temperature of about 600° F. to about 300° F., passes via line (14) to a cleanup section (15) where particulates and various impurity gases, such as H₂S, may be removed. The details of the gas cleanup form nó part of the invention. Steam requirements for cleanup activities may be supplied by line (16). The purified synthesis gas passes from section (15) in line (17), and is ready for use.

Concomitantly, superheated steam in line (13) enters the high pressure section (30) of steam turbine (31). Line (32) provides passage of intermediate pressure steam is cleanup section (15). Intermediate pressure steam also passes via line (33) to the intermediate pressure section (34) of turbine (31). Intermediate pressure steam from (34) passes via line (35) to the low pressure section (36) where it does further duty. Steam from (34) may also be sent via line (37) to cleanup section (15). A condenser (38) provides vacuum via line (39). Tubrin (31) drives a generator (40) to produce electricity.

Condensate, at a temperature of about 100° F., is removed via line (50). Boiler feed water may be added to the condensate, after blowdown, and the combined stream sent to low temperature heat exchanger (51) for preheating condensate prior to deaerating. From exchanger (51) the condensate is sent to deaerator (52) to remove traces of inerts. The deaerated condensate is sent via line (53) to the low temperature section of exchanger (7). Heated water from the low temperature section of exchanger (7) is sent via line (54) to vessel (10). As noted, water is also sent from vessel (10) to gasifier (3), via line (55).

What is claimed is:

1. A synthesis gas generation complex comprising
   (a) a coal gasification plant, including at least one gasifier for the gasification of coal to produce synthesis gas at a temperature of about 2000° F. to 3000° F., the gasifier having heat exchange surfaces adapted for indirect heat exchange with steam and water;
   (b) a heat exchange section comprising at least one heat exchanger in gas flow communication with said gasifier, said heat exchanger comprising at least one segment adapted to generate superheated steam, and lower temperature heat exchange segments;
   (c) a gas cleanup section in flor communication with said heat exchanger, said cleanup section comprising means for removing particulates and $H_2S$ from said synthesis gas;
   (d) a steam turbine adapted to receive and utilize superheated steam and produce a low temperature vapor, said steam turbine driving an electrical generator;
   (e) means for providing superheated steam from said heat exchanger to said steam turbine;
   (f) means for condensing low temperature vapor froms aid steam turbine to produce condensate, in flow communication with said steam turbine; and
   (g) means for supplying condensate, from said means for condensing low temperature vapor, to a lower temperature heat exchange segment of at least one heat exchanger in said heat exchange section for indirect heat exchange of said condensate;
   (h) means for recovering heated condensate from said lower temperature heat exchange section; and
   (i) means for supplying heated condensate from said means for recovering heated condensate to the heat exchange surfaces of a gasifer in said gasification zone for indirect heat exchange generation of steam.

2. The complex of claim 1 wherein the gasifier comprises at least one burner adapted to utilize dry particulate coal.

3. A process for the production of synthesis gas and power generation comprising (a) partically oxidizing coal at an elevated temperature by feeding dry particulate coal and oxygen to a gasification zone, the ratio of coal to oxygen being such as to maintain a reducing atmosphere, and producing raw synthesis gas having a temperature of from about 2000° F. to about 3000° F. and removing heat from said synthesis gas in said gasification zone by indirect heat exchange with steam and water at a temperature of about 220° F. to 650° F.;
   (b) passing raw synthesis gas from step (a) to a heat exchange zone comprising a superheated steam generating system section and a lower temperature heat exchange section, and removing heat from said synthesis gas by indirect heat exchange with steam, and water at a temperature of from about 220° F. to about 650° F., and producing superheated steam from said steam;
   (c) removing particulates and $H_2S$ from said raw synthesis gas, producing a purified synthesis gas;
   (d) passing superheated steam from said heat exchange zone to at least one steam turbine, and expanding superheated steam from said heat exchange zone through said steam turbine, producing a low temperature water vapor and driving said turbine, said steam turbine driving an electrical generator and producing electric power;
   (e) condensing said low temperature water vapor, and passing condensate to the lower temperature heat exchange section, and utilizing said condensate as the water in step (b), producing heated condensate; and
   (f) utilizing heated condensate produced by heat exchange in step (e) as the water for indirect heat exchange in step (a).

4. The process of claim 3 wherein the gasification zone comprises at least one burner for oxidizing the coal.

5. A synthesis gas generation complex comprising
   (a) a coal gasification plant, including at least one gasifier for the gasification of coal to produce synthesis gas at a temperature of about 2000° F. to 3000° F., the gasifier having heat exchange surfaces adapted for indirect heat exchange with steam and water;
   (b) a heat exchange section comprising at least one heat exchanger in gas flow communication with said gasifier, said heat exchanger comprising at least one segment adapted to generate superheated steam, and lower temperature heat exchange segments;
   (c) a gas cleanup section in flow communication with said heat exchanger, said cleanup section comprising means for removing particulates and $H_2S$ from said synthesis gas;
   (d) a steam turbine adapted to receive and utilize superheated steam and produce a low temperature vapor, said steam turbine driving an electrical generator;
   (e) means for providing superheated steam from said heat exchanger to said steam turbine;
   (f) means for condensing low temperature vapor from said steam turbine to produce condensate, in flow communication with said steam turbine;
   (g) means for supplying condensate, from said means for condensing low temperature vapor, to a lower temperature heat exchange segment of at least one heat exchanger in said heat exchange section for indirect heat exchange of said condensate;

(h) means for recovering heated condensate from said lower temperature heat exchange section;

(i) means for supplying heated condensate from said means for recovering heated condensate to the heat exchange surface of a gasifier in said gasification zone for indirect heat exchange generation of steam; and (j) means for passing intermediate steam from the steam turbine to said cleanup section.

6. A process for the production of synthesis gas and power generation comprising (a) partially oxidizing coal at an elevated temperature by feeding dry particulate coal and oxygen to a gasification zone, the ratio of coal to oxygen being such as to maintain a reducing atmosphere, and producing raw synthesis gas having a temperature of from about 2000° F. to about 3000° F. and removing heat from said synthesis gas in said gasification zone by indirect heat exchange with steam and water at a temperature of about 220° F. to 650° F.;

(b) passing raw synthesis gas from step a) to a heat exchange zone comprising a superheated steam generating system section and a lower temperature heat exchange section, and removing heat from said synthesis gas by indirect heat exchange with steam, and water at a temperature of from about 220° F. to about 650° F., and producing superheated steam from said steam;

(c) removing particulates and $H_2S$ from said raw synthesis gas, producing a purified synthesis gas;

(d) passing superheated steam from said heat exchange zone to at least one steam turbine, and expanding superheated steam from said heat exchange zone through said steam turbine, producing a low temperature water vapor and driving said turbine, said steam turbine driving an electrical generator and producing electric power;

(e) condensing said low temperature water vapor, and passing condensate to the lower temperature heat exchange section, and utilizing said condensate as the water in step (b), producing heated condensate;

(f) utilizing heated condensate produced by heat exchange in step (e) as the water for indirect heat exchange in step (a); and (g) passing intermediate steam produced in the steam turbine to the cleanup section and utilizing passed intermediate steam for heat exchange therein.

* * * * *